United States Patent
Rollins et al.

(10) Patent No.: US 8,944,216 B2
(45) Date of Patent: Feb. 3, 2015

(54) LUBRICATING TRANSFER TUBE

(75) Inventors: Michael J. Rollins, Chula Vista, CA (US); Melissa A. Bell, San Diego, CA (US)

(73) Assignee: United Technologies Corporation, Hartford, CT (US)

(*) Notice: Subject to any disclaimer, the term of this patent is extended or adjusted under 35 U.S.C. 154(b) by 348 days.

(21) Appl. No.: 13/086,464

(22) Filed: Apr. 14, 2011

(65) Prior Publication Data

US 2012/0260769 A1  Oct. 18, 2012

(51) Int. Cl.
*F01M 11/02* (2006.01)
*F16H 57/04* (2010.01)

(52) U.S. Cl.
CPC ........ *F16H 57/0456* (2013.01); *F16H 57/0495* (2013.01)
USPC ........................................ 184/11.2; 184/6.12

(58) Field of Classification Search
CPC ............ F16H 57/0421; F16H 57/0423; F16H 57/043; F16H 57/0426; F16H 57/046; F16N 7/32; F16N 7/34
USPC ...................................... 184/6.12, 11.2, 6.17
See application file for complete search history.

(56) References Cited

U.S. PATENT DOCUMENTS

| | | | | |
|---|---|---|---|---|
| 1,429,466 A | * | 9/1922 | Turnbull | 184/6.12 |
| 1,430,527 A | * | 10/1922 | Eugene | 29/402.06 |
| 2,242,195 A | * | 5/1941 | Teker et al. | 184/11.1 |
| 2,333,161 A | * | 11/1943 | Dunn | 184/6.12 |
| 2,535,703 A | * | 12/1950 | Smith et al. | 184/6.12 |
| 3,548,971 A | | 12/1970 | Fisher | |
| 3,738,452 A | * | 6/1973 | Hausinger | 184/6.12 |
| 3,762,740 A | | 10/1973 | Cass | |
| RE28,992 E | | 10/1976 | Cass | |
| 4,029,400 A | | 6/1977 | Eitel | |
| 4,105,092 A | * | 8/1978 | Zeidler et al. | 184/6.4 |
| 4,284,174 A | | 8/1981 | Salvana et al. | |
| 4,527,911 A | | 7/1985 | Davis | |
| 4,658,665 A | * | 4/1987 | Strinzel et al. | 74/467 |
| 4,667,774 A | | 5/1987 | Roberge | |
| 4,738,589 A | | 4/1988 | Wright | |
| 4,844,202 A | * | 7/1989 | Maresko | 184/6.12 |
| 4,976,335 A | * | 12/1990 | Cappellato | 184/6.4 |
| 5,121,815 A | * | 6/1992 | Francois et al. | 184/6.4 |
| 5,158,152 A | * | 10/1992 | Nemoto et al. | 184/6.12 |
| 5,341,900 A | | 8/1994 | Hikes | |
| 5,411,116 A | | 5/1995 | Kish et al. | |
| 5,785,149 A | * | 7/1998 | Luyts | 184/6.12 |
| 6,206,140 B1 | * | 3/2001 | Craft et al. | 184/8 |
| 6,817,448 B2 | * | 11/2004 | Maret et al. | 184/6.26 |
| 7,172,054 B2 | | 2/2007 | Ruther et al. | |
| 7,810,404 B2 | * | 10/2010 | Miyagoe | 74/339 |
| 2007/0295159 A1 | * | 12/2007 | Nishi et al. | 74/606 R |
| 2008/0251324 A1 | * | 10/2008 | Kuryu | 184/6.12 |
| 2010/0018807 A1 | * | 1/2010 | Grenfeldt et al. | 184/6.12 |
| 2012/0088624 A1 | * | 4/2012 | Sheridan | 475/159 |

* cited by examiner

*Primary Examiner* — William E Dondero
*Assistant Examiner* — Minh Truong
(74) *Attorney, Agent, or Firm* — Carlson, Gaskey & Olds, P.C.

(57) ABSTRACT

An example lubricating transfer tube assembly includes a transfer tube having a bore extending from a fluid inlet portion to a fluid outlet portion. The transfer tube is configured to communicate a fluid through the bore between the fluid inlet portion and the fluid outlet portion within a gearbox. The transfer tube defines a spray aperture extending from the bore to an outer surface of the transfer tube. The spray aperture is configured to communicate at least some of the fluid from the bore to an area of the gearbox.

21 Claims, 4 Drawing Sheets

LUBRICATING TRANSFER TUBE

STATEMENT REGARDING GOVERNMENT INTEREST

This invention was made with government support under Contract No. N00019-06-C-0081, and Subcontract No. 4500019224, awarded by the United States Navy. The Government has certain rights in this invention.

BACKGROUND

This disclosure relates generally to a gearbox transfer tube and, more particularly, to a gearbox transfer tube that communicates some lubricant directly to an interior of the gearbox assembly.

Generators provide electric power as is known. Aircraft auxiliary power units, for example, typically include a generator that is driven by a turbine engine. The turbine engine is rotatably coupled to the generator through a gearbox.

Transfer tubes associated with the gearbox often carry fluid between different portions of the gearbox. The fluid moves from a first end of the transfer tube to an opposing, second end of the transfer tube. In one example, a transfer tube carries a lubricating fluid from a first side of the gearbox to an opposing, second side of the gearbox. The lubricating fluid is then communicated through one or more lubrication nozzles, which are separate from the transfer tube. The lubrication nozzles communicate a spray of lubricant directly to areas of the gearbox that need lubricating, such as interfaces associated with gears and bearings. Lubrication nozzles add complexity and weight to the gearbox assembly.

SUMMARY

An example lubricating transfer tube assembly includes a transfer tube having a bore extending from a fluid inlet portion to a fluid outlet portion. The transfer tube is configured to communicate a fluid through the bore between the fluid inlet portion and the fluid outlet portion within a gearbox. The transfer tube defines a spray aperture extending from the bore to an outer surface of the transfer tube. The spray aperture is configured to communicate at least some of the fluid from the bore to an area of the gearbox.

An example auxiliary power unit gearbox assembly includes a housing establishing a gearbox cavity configured to receive a plurality of gears. A transfer tube establishes a bore. The transfer tube is configured to communicate a fluid from a first face of the housing to an opposing, second face of the housing. The transfer tube defines a spray aperture extending from the bore to a radially outer surface of the transfer tube. The spray aperture is configured to deliver a spray of the fluid to an area within the gearbox cavity.

An example method of lubricating an auxiliary power unit gearbox assembly includes positioning at least a portion of a gearbox transfer tube within a gearbox cavity of a gearbox. The method communicates lubricant through a bore of a gearbox transfer tube from a first end portion to second end portion of the transfer tube. The method moves some of the lubricant through an aperture in the transfer tube. The lubricant is moved directly to a portion of the gearbox cavity.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
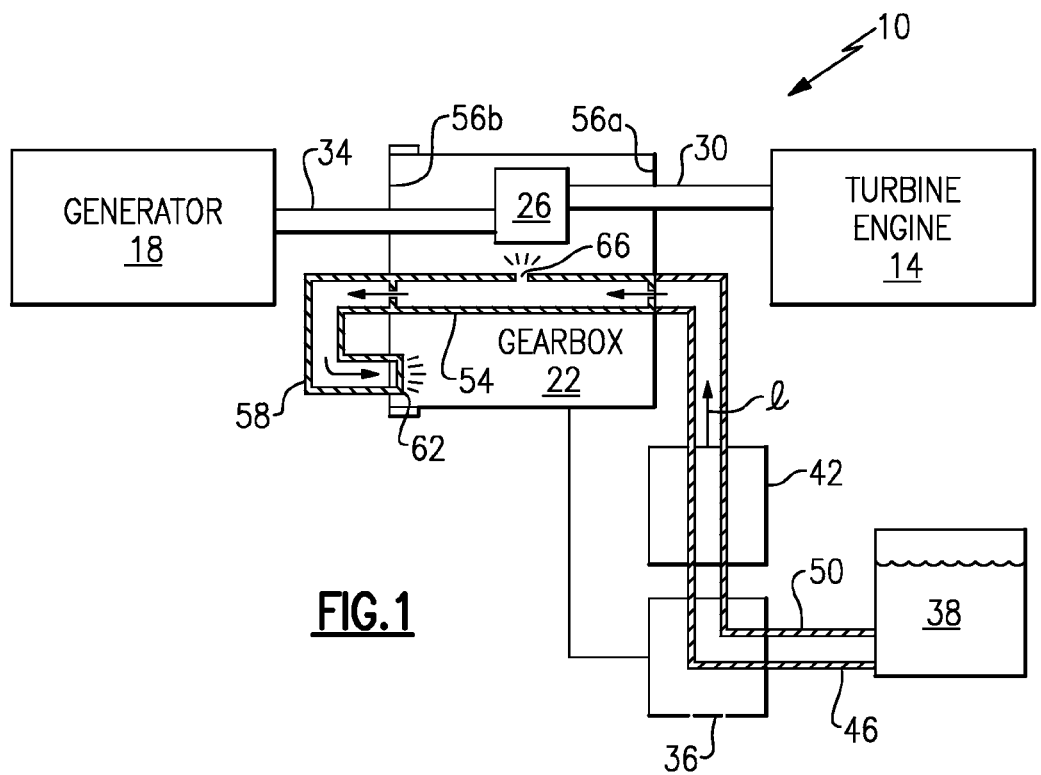
FIG. 1 shows a highly schematic view of an example auxiliary power unit assembly.
Figure 3:
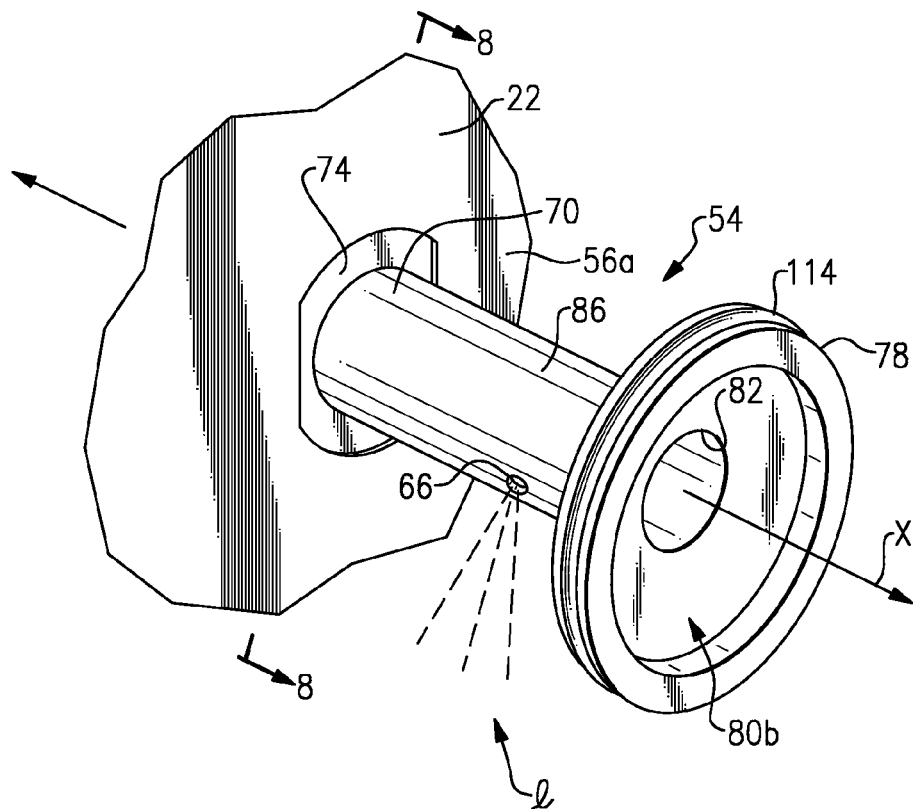
FIG. 3 shows a close-up view of the FIG. 2 transfer tube.
Figure 2:
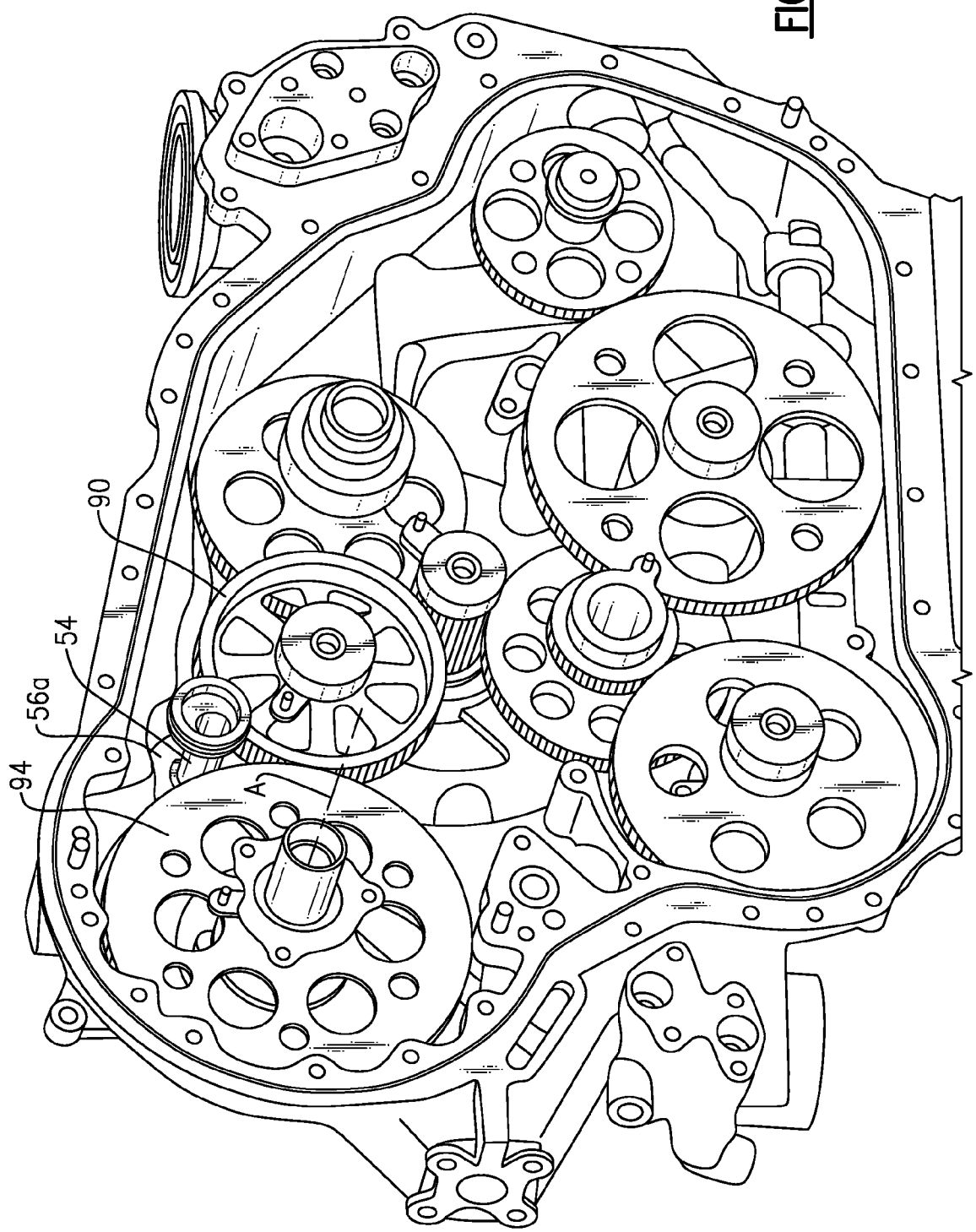
FIG. 2 shows a gearbox assembly of the FIG. 1 auxiliary power unit assembly with a cover removed.
Figure 4:
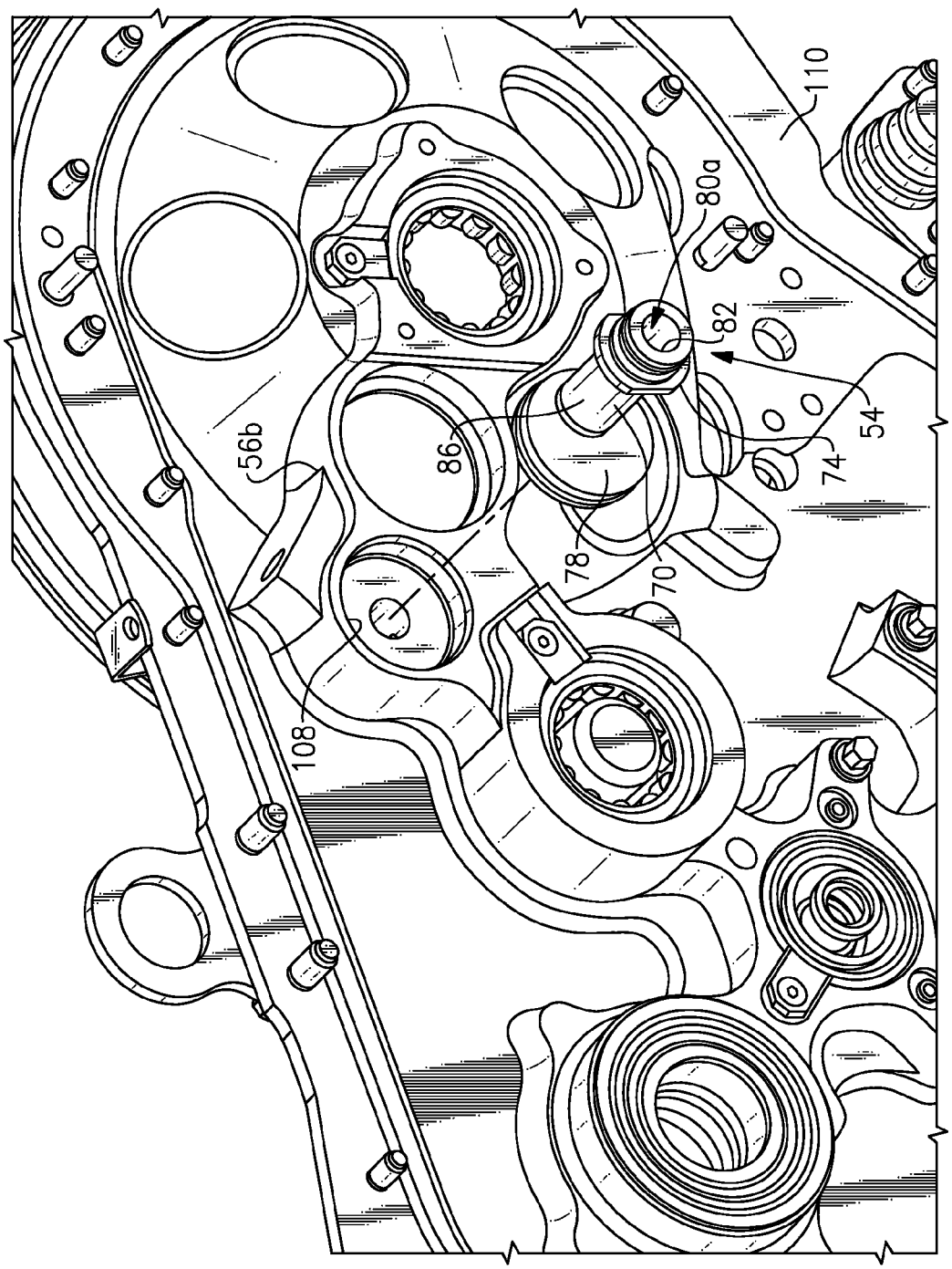
FIG. 4 shows a partially exploded view of the cover of the FIG. 2 gearbox assembly.
Figure 5:
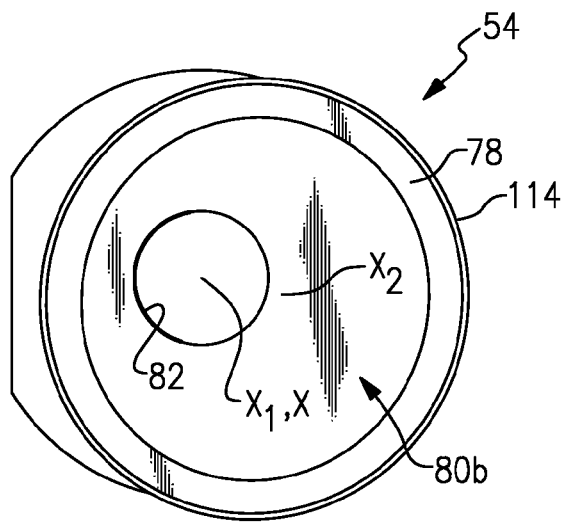
FIG. 5 shows an end view of the FIG. 3 transfer tube.
Figure 6:
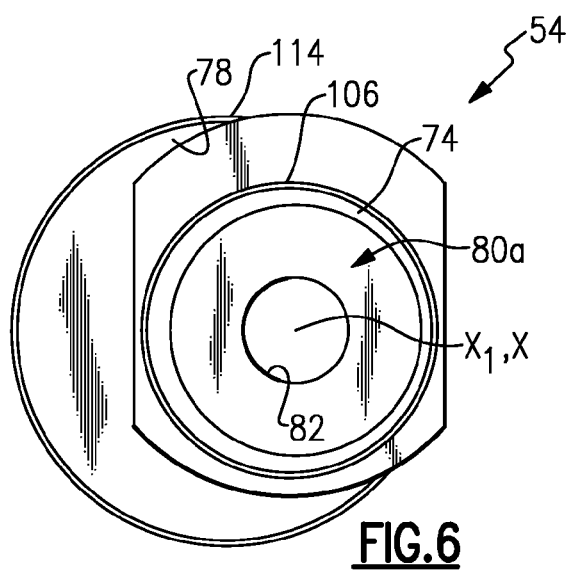
FIG. 6 shows another end view of the FIG. 3 transfer tube opposite the FIG. 5 end view.

Referring to FIG. 1, an example auxiliary power unit assembly 10 includes a turbine engine 14 rotatably coupled to a generator 18 through a gearbox 22. The gearbox includes a plurality of gears 26 within a gear train. The gears 26 rotatably couple a shaft 30 of the turbine engine 14 to an input shaft 34 of the generator 18. The gears 26 may also rotatably couple other devices, such as a pump 36, to the shaft 30.

A lubricant l, or another type of fluid, moves from a lubricant supply 38 through a cooler 42 to the gearbox 22. The lubricant l moves along a lubricant path 46. The pump 36 is used to communicate the lubricant l along the lubricant path 46. The lubricant l is used to lubricate and cool at least the gears 26 within the gearbox 22.

The example lubricant path 46 includes a first conduit portion 50, a transfer tube 54, a second conduit portion 58, and a lubrication nozzle 62. In this example, the first conduit portion 50 and the second conduit portion 58 are located outside the gearbox 22, and the transfer tube 54 and the lubrication nozzle 62 are positioned within the gearbox 22.

The example transfer tube 54 is machined from aluminum. The example transfer tube 54 is sized to extend across a gearbox cavity from a first face 56a of a gearbox housing to an opposing, second face 56b of the gearbox housing. The example transfer tube 54 communicates the lubricant l across the gearbox cavity from the first conduit portion 50 to the second conduit portion 58. As can be appreciated, the transfer tube 54 communicates the lubricant l between the two opposing faces 56a and 56b.

Notably, at least some of the lubricant l moves away from the transfer tube 54 through a spray aperture 66. The lubricant l moving through the spray aperture 66 lubricates and cools at least some of the gears 26. The spray aperture 66 is axially spaced from the first face 56a and the second face 56b.

Referring to FIGS. 2-7, the example transfer tube 54 includes a central section 70 that connects a first end portion 74 to a second end portion 78. In this example, the first end portion 74 establishes a fluid inlet 80a that receives the lubricant l from the first conduit portion 50, and the second end portion 78 establishes a fluid outlet 80b that communicates at least some of the lubricant l to the second conduit portion 58.

The central section 70 of the example transfer tube 54 extends along an axis X. The central section 70 establishes a cylindrical bore 82. The example spray aperture 66 extends radially relative to the axis X from the bore 82 to an outer surface 86 of the central section 70.

In this example, the spray aperture 66 is configured to communicate the lubricant l to a meshing location between a first gear 90 and a second gear 94. The lubricant cools and lubricates the meshing location between the gears 90 and 94. The gear 94 of the gearbox 22 rotates about an axis A. The axis X of the bore 82 is parallel to the axis A in this example, and the spray aperture 66 is perpendicular to the axis X.

In other examples, the locations, sizes, and quantity of the spray aperture 66 are varied based on the lubrication requirements. Also, although described as a "spray" aperture, the spray aperture 66 is not limited to spraying lubricant l. For example, the spray aperture may allow the lubricant l to drip onto the meshing location or some other location.

The first end portion 74 and the second end portion 78 of the transfer tube 54 are both cylindrical in this example. The first end portion 74 establishes an axis $X_1$, and the second end portion 78 establishes an axis $X_2$. Notably, the axis $X_1$ of the example first end portion 74 is the same as the axis X of the bore 82. That is, the first end portion 74 and the central section 70 are coaxial. By contrast, the axis $X_2$ of the example second end portion 78 is offset from the axis X of the bore 82 and the axis $X_1$ of the first end portion 74.

The positions of the first end portion 74 and the second end portion 78 relative to the central section 70 (including the axial positions) may be adjusted depending on the geometry of the gearbox 22 and the gears 26. In this example, the second end portion 78 and the bore 82 are axially offset to facilitate positioning the central section 70, and specifically the spray aperture 66 of the central section 70, near the meshing location while providing room to secure the second end portion 78. The offset functions as a clocking feature to circumferentially orient the central section 70. In another example, another clocking feature is used, such as a raised area of the second end portion 78 received within a notch. The raised area is only received in the notch when the central section 70 is circumferentially aligned to direct spray from the spray aperture 66 in a desired area.

Figure 7:
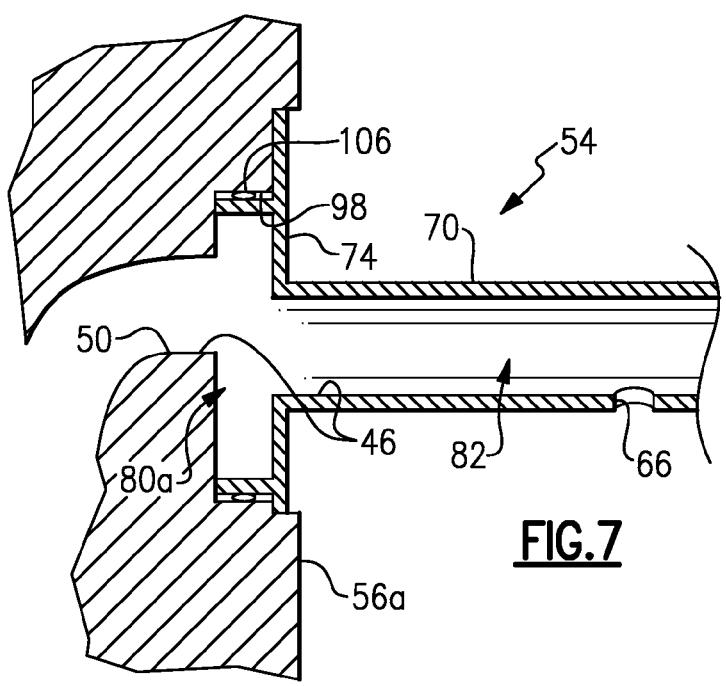
FIG. 7 shows a section view at line 8-8 in FIG. 3.

The first end portion 74 is configured to be received within a recess 98 that is established within the first face 56a of the gearbox housing. An O-ring 106 seals the radially outer interface between the recess 98 and the first end. The lubricant l moves from the first conduit portion 50 into the first end portion 74. The lubricant l then moves through the central section 70. Notably, the first conduit section 50 is not coaxial with the axis $X_1$ or the axis X, which may facilitate positioning the first end portion 74 in an area that avoids the gears 26 and other components. The first end portion 74 has a cup-shaped cross-sectional profile in this example (FIG. 7). The second end portion 78 has a similar cross-sectional profile.

The second end portion 78 is configured to be received within a recess 108 established within a cover 110 of the gearbox 22. The second end portion 78 includes an O-ring 114 to seal the radially outer interface between the second end portion 78 and the cover 110. Lubricant l communicates from the bore 82 to a cavity established within the second end portion 78 through the cover 110 to the second conduit portion 58.

Features of the disclosed example include a transfer tube that both transfers lubricant through a gearbox and communicates lubricant directly to areas of the gearbox requiring lubrication.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A lubricating transfer tube assembly, comprising:
   a transfer tube including a bore extending continuously along a linear axis from a fluid inlet portion to a fluid outlet portion, the transfer tube configured to communicate a fluid through the bore between the fluid inlet portion and the fluid outlet portion within a gearbox, the transfer tube defining a spray aperture extending from the bore to an outer surface of the transfer tube, a portion of the outer surface defining the spray aperture, the portion being open and exposed to an interior area of the gearbox, the spray aperture configured to communicate at least some of the fluid from the bore to the interior area of the gearbox, wherein the gearbox includes a plurality of gears and each of the gears within the gearbox is configured such that the transfer tube supports no gears. wherein the gearbox includes a gearbox housing including a plurality of inwardly facing surfaces that establish the interior area, and the bore of the transfer tube spans across the interior area from and through a first one of the plurality of inwardly facing surfaces to and through an opposing, second one of the plurality of inwardly facing surfaces.

2. The lubricating transfer tube assembly of claim 1, wherein the fluid outlet portion establishes an outlet axis that is spaced from a longitudinal axis of the bore.

3. The lubricating transfer tube assembly of claim 1, wherein the gearbox includes a gearbox housing including a plurality of inwardly facing surfaces that establish the interior area, the fluid inlet configured to receive fluid directly from a first position near a first one of the plurality of inwardly facing surfaces, and the fluid outlet is configured to communicate fluid directly to a second position near a second one of the plurality of inwardly facing surfaces.

4. The lubricating transfer tube assembly of claim 3, wherein the second one of the plurality of inwardly facing surfaces is an inwardly facing surface of a cover of the gearbox housing.

5. The lubricating transfer tube assembly of claim 3, wherein the fluid inlet portion is radially enlarged relative to the bore, and the fluid inlet portion is configured to be received within a recess established in the gearbox housing.

6. The lubricating transfer tube assembly of claim 5, including an o-ring secured around the fluid inlet portion, the o-ring configured to seal fluid flow at a radially outer interface between the fluid inlet portion and the gearbox housing.

7. The lubricating transfer tube assembly of claim 3, wherein the spray aperture is spaced from the inwardly facing surfaces.

8. The lubricating transfer tube assembly of claim 1, wherein the fluid comprises a lubricant and coolant.

9. The lubricating transfer tube assembly of claim 1, wherein the outer surface is a radially outer surface relative to a longitudinal axis of the bore.

10. The lubricating transfer tube assembly of claim 1, wherein the aperture is axially spaced from the fluid inlet portion and the fluid outlet portion.

11. The lubricating transfer tube assembly of claim 1, wherein the linear axis of the bore is offset from an inlet axis of the fluid inlet portion, an outlet axis of the fluid outlet portion, or both.

12. An auxiliary power unit gearbox assembly, comprising:
    a housing establishing a gearbox cavity configured to receive a plurality of gears; and
    a transfer tube establishing a bore, the transfer tube configured to communicate a fluid from a first face of the housing to an opposing, second face of the housing, the bore extending continuously along a linear axis from and through the first face to and through the second face, the transfer tube defining a spray aperture extending from the bore to a radially outer surface of the transfer tube, the spray aperture configured to deliver a spray of the fluid to an interior area within the gearbox cavity, the radially outer surface that provides an outlet of the spray aperture being open and exposed to the interior area, wherein the transfer tube supports no gears.

13. The auxiliary power unit gearbox assembly of claim 12, wherein the housing comprises a housing cover, and one end of the transfer tube is received within a recess of the cover.

14. The auxiliary power unit gearbox assembly of claim 12, wherein the plurality of gears are configured to be driven by a rotatable input provided by a turbine engine shaft, and an axis of the bore generally parallel to an axis of rotation of the turbine engine shaft.

15. The auxiliary power unit gearbox assembly of claim 12, wherein the first face and the second face are both inwardly facing surfaces of the housing.

16. The auxiliary power unit gearbox assembly of claim 12, including a first end portion of the transfer tube configured to fluidly couple the transfer tube to the first face, and a second end portion of the transfer tube configured to fluidly couple the transfer tube to the second face, at least one of the first end portion or the second end portion establishing an end portion axis that is generally parallel to and spaced from a longitudinal axis of the bore, wherein a central portion of the transfer tube joins the first end portion to the second end portion.

17. The auxiliary power unit gearbox assembly of claim 16, wherein the first face establishes a conduit portion extending along a conduit axis and configured to deliver the fluid to the first end portion, wherein the conduit axis is spaced from the end portion axis of the first end portion.

18. A method of lubricating an auxiliary power unit gearbox assembly, comprising:
communicating fluid through a bore of a gearbox transfer tube from a first end portion to second end portion of the transfer tube extending along a linear axis, wherein at least a portion of the gearbox transfer tube is within a gearbox cavity of the gearbox having gears;
moving some of the fluid through an aperture in the transfer tube directly to a portion of the gearbox cavity, wherein each of the gears within the gearbox is unsupported by the gearbox transfer tube within the gearbox cavity of the gearbox and the aperture in the transfer tube is uncovered by any of the gears within the gearbox; and
engaging a first wall of the gearbox with the first end portion, and engaging an opposing, second wall of the gearbox with the second end portion wherein the bore extends through the first wall and through the second wall.

19. The method of claim 18, wherein the second wall is a cover of the gearbox.

20. The method of claim 18, wherein a portion of the gearbox cavity to which the fluid through the aperture in the transfer tube is moved and sprayed by fluid moved through the aperture in the transfer tube is spaced from the gearbox transfer tube.

21. The method of claim 18, wherein a linear axis of the bore is offset from an axis of the first end portion, an axis of the second end portion, or both.

* * * * *